June 14, 1932.                J. H. COHEN                1,862,661
                      ASH RECEIVER FOR MOTOR VEHICLES
                   Filed Dec. 9, 1929      2 Sheets-Sheet 1
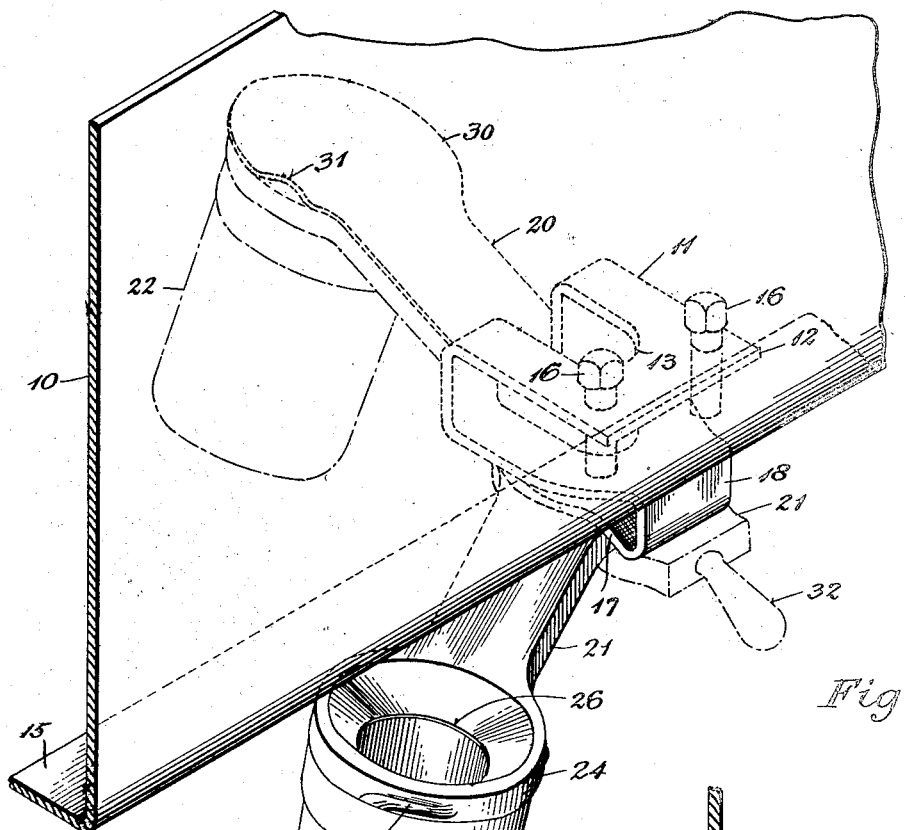
Fig.1.
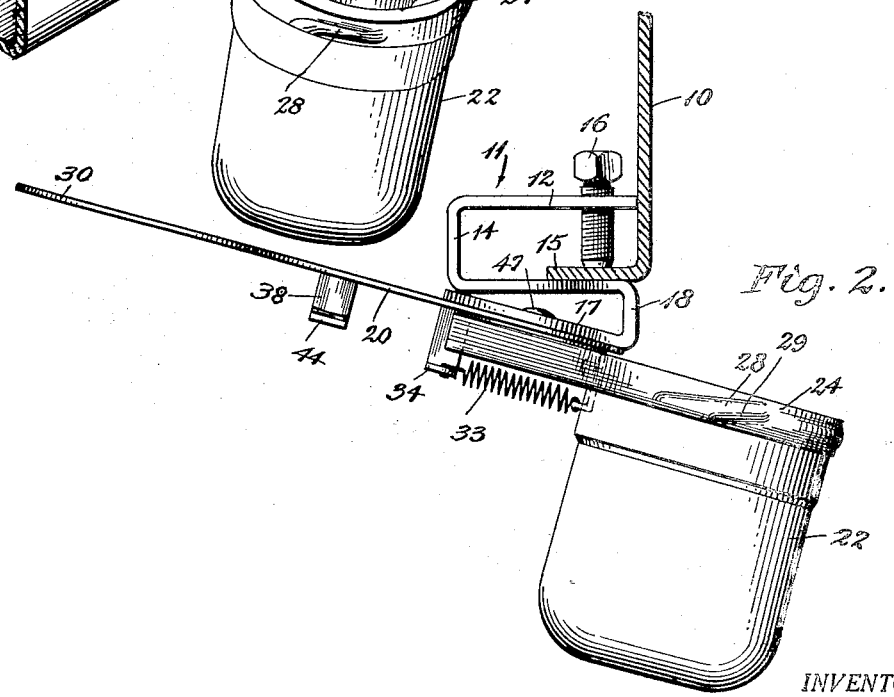
Fig.2.
INVENTOR.
Joseph H. Cohen,
BY
ATTORNEY.

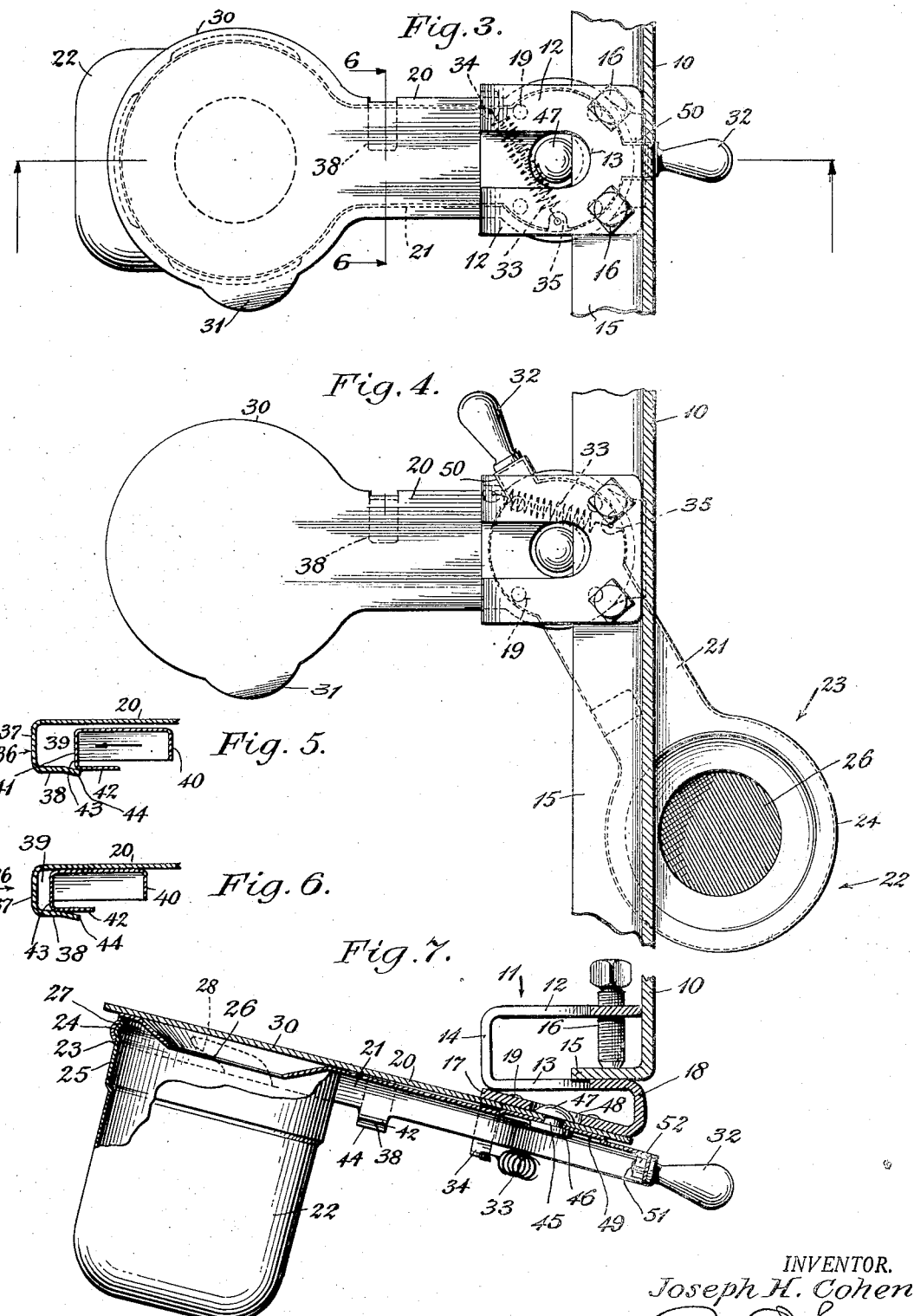

Patented June 14, 1932

1,862,661

UNITED STATES PATENT OFFICE

JOSEPH H. COHEN, OF BRIDGEPORT, CONNECTICUT

ASH RECEIVER FOR MOTOR VEHICLES

Application filed December 9, 1929. Serial No. 412,714.

This invention relates to ash receivers for motor vehicles, and more particularly, to that kind which is adapted to be mounted on the instrument board so that the ash receptacle thereof may be moved from a position behind the instrument board to a position in front thereof for use.

An object of this invention is to provide an ash receiver of the kind specified which is mounted so that in its inoperative position it is up behind the instrument board where it is out of sight and not liable to be engaged by the knees of a person sitting adjacent the instrument board, and which in its operative position is down and in front of the instrument board with the mouth thereof inclined so as to be more accessible to receive ashes of cigar or cigarette butts which the user may desire to deposit in the receptacle.

Another object of this invention is to provide an ash receiver which may be mounted on the lower edge or flange of the instrument board so that the mounting means may be concealed and so as to avoid defacing or marring the face of the instrument board.

Another object of this invention is to provide an ash receiver of the kind specified having resilient means for completing the movement of the ash receptacle from accessible to inaccessible position with means for absorbing the shock incidental to the return of the ash receptacle to inaccessible position.

A further object is to provide an ash receiver having a cover which cooperates with the ash receptacle to smother any of the contents thereof which may be smothered when the receptacle is in inaccessible position, with means for drawing the receptacle and the cover into close superposed engagement when the ash receptacle is moved to inaccessible position and to prevent rattling of these parts against each other which might be caused by vibration of the vehicle or the motor thereof when running.

And a still further object of this invention is to provide directly on the receptacle carrying arm a handle for the purpose of swinging the ash receptacle from inaccessible to accessible position, and further to make the handle separately attachable so that a handle, in style and design like the other hardware about the motor vehicle, may be applied to the ash receiver to operate the same.

Other objects and advantages will hereinafter appear.

In the accompanying drawings which illustrate one form of the present invention—

Figure 1 is a perspective view of the ash receiver made in accordance with the present invention, showing it as applied to an instrument board, the ash receptacle being in its accessible position with its inaccessible position indicated in dot-and-dash lines.

Fig. 2 is a side elevation of the device showing it applied to an instrument board and showing the receptacle in its position in front of the instrument board where it is accessible for use.

Fig. 3 is a top plan view of the device, showing the receptacle in its inaccessible position.

Fig. 4 is a similar view, showing the receptacle in its accessible position.

Fig. 5 is a detail view showing the means for absorbing the shock incidental to the return of the receptacle carrying arm to its inaccessible position, the receptacle carrying arm being shown as approaching such position.

Fig. 6 is a similar view, showing the receptacle carrying arm at the end of its rearward movement.

Fig. 7 is a view similar to Fig. 2, but shows the parts of the device in section and shows the ash receptacle and its carrying arm in inaccessible position behind the instrument board.

In my copending application, Serial No. 403,998, filed November 1st, 1929, I have disclosed an ash receiver having a supporting frame adapted to be attached to the lower margin of the instrument board and comprising an ash receptacle and a carrying arm therefor pivoted on a vertical axis parallel to the instrument board so that the receptacle carrying arm may be moved to carry the ash receptacle from a position behind the instrument board to a position in front thereof for use. The said device is provided with a handle or finger-piece by means of which the movements of the receptacle to and from operative position are controlled, and a spring or other resilient means is provided for completing the movements of the ash receptacle to and from accessible and inaccessible positions. Also, said device includes a cover adapted to overlie the ash receptacle in its inaccessible position to exclude air therefrom and cause any of the contents thereof which may be smoldering to be smothered and thus extinguished.

Accordingly, it will be understood that there are features disclosed herein which are the same or like those disclosed in my copending application. Any such features which are common to both disclosures are not claimed herein but are claimed in my said copending application, Serial No. 403,998, filed November 1st, 1929.

As shown in the accompanying drawings, the ash receiver is adapted to be mounted on an instrument board 10 of a motor vehicle. So that this may be done without defacing or marring the face of the instrument board by the application of any parts thereto, the present invention provides the device with a bracket 11 which has an upper horizontal arm 12 and a lower horizontal arm 13 with a connecting vertical arm 14. The arms 12 and 13 are adapted to embrace a lower flange 15 of the instrument board 10 so that when one or more screws 16 carried by the upper arm 12 are tightened against the upper surface of the instrument board flange 15, the latter will be clamped between the screws and the lower arm 13 of the bracket. The bracket 11 also has an arm 17 connected to the arm 13 of a vertical arm 18.

Secured to the arm 17 of the bracket by rivets 19 is a plate 20 on which there is pivotally mounted an arm 21 which carries a cup-like receptacle 22. The receptacle-carrying arm 21 is provided with an enlarged head 23 having a flange 24 forming a socket to receive the upper end 25 of the cup-like receptacle 22 and the head 23 is provided with an aperture 26 through which ashes or tobacco products, or other articles to be disposed of, may pass into the cup 22.

To permit the cup-like ash receptacle 22 to be removed from the carrying arm 21 with ease so that the contents of the cup may be disposed of, and yet to prevent accidental removal of the cup, the latter is provided with embossed lugs 27 adapted to pass through and be locked in bayonet slots 28 provided in the flange 24 on the head 23 of the carrying arm 21 by embossing the same therein. The lower edge 29 of each bayonet slot 28 is inclined upwardly so as to draw the top edge of the cup upwardly against the enlarged head 23 of the carrying arm and securely clamp the cup in place.

Hence, to remove the cup 22, it is rotated relative to the head 23 to unlock the lugs 27 from the bayonet slots 28 to permit the lugs to pass downwardly through the vertical portions of the bayonet slots. In replacing the cup, it is merely necessary to align the lugs 22 with the vertical portions of the slots 28, push the cup upwardly slightly, and rotate it to cause the lugs to ride up the inclined edge 29 of the slots. In its inaccessible position shown in Figs. 3 and 7, the receptacle-carrying arm 21 is located directly beneath a rear extension 30 of the plate 20 and close to it. The extension 30 constitutes a cover plate for the opening 26 of the receptacle 22 and excludes fresh air from the receptacle so that should any of the articles contained in the receptacle be burning or smoldering, the oxygen in the receptacle will be quickly used up and the smoldering or burning articles will be extinguished without danger of them causing fire.

In order to guide the ash receptacle-carrying arm 21 under the extension or cover plate 30 when the former is moved into its rearward position under the cover plate, the present invention provides a lip 31 on the side of the cover plate 30 first approached by the carrying-arm 21 and this lip is given a slight upward bend so that should the arm 21 in returning be too high, it will be cammed down by this lip 31.

In my copending application, Serial No. 403,998, filed November 1st, 1929, above referred to, I have shown a finger-piece connected by gearing to the receptacle-carrying arm and adapted to move or initiate the movement of the latter to and from accessible and inaccessible positions, a spring or other resilient means being provided to complete the movement of the receptacle-carrying arm should it not be completed by actual manipulation of the finger-piece.

According to the present invention, a substantially simplified construction is provided and, instead of the finger-piece with its connecting gearing, there is provided, in the embodiment of the invention shown herein, a finger-piece 32 mounted directly on the receptacle-carrying arm 21 and preferably on the longitudinal axis of this arm. When the receptacle-carrying arm is in its rearward position with the receptacle 22 concealed and inaccessible, the handle 32 projects outwardly at right angles in a vertical plane from the instrument board, as shown in Fig. 3.

To make the ash receptacle 22 accessible, it is merely necessary for the user to engage the finger-piece 32 and push it to the right until the handle is approximately flush with the instrument board, whereupon a spring 33, having one end carried by an ear 34 on the plate 20 and the other end carried by an ear 35 on the receptacle-carrying arm 21, which is tensioned during the manual operation of the handle 32, is carried beyond the axis of oscillation of the receptacle-carrying arm 21 and causes the latter to continue to move to bring the receptacle to the position shown in Figs. 1 and 4.

Hence, it is unnecessary for the user to continue to engage and operate the handle 32 after it begins to pass under the instrument board, for, when that portion of the movement has been completed, the spring 33 will finish it. In doing so, the handle 32 moves to a comparatively inaccessible position under the instrument board; but to return the receptacle to its concealed position, it is merely necessary for the user to engage the receptacle and move it rearwardly until the spring 33 can complete that movement. If the user does this with a rapid movement of the hand, the momentum of the parts may be depended upon to carry the spring across the axis of oscillation of the receptacle-carrying arm, even though the operator's hand does not actually complete the necessary initial movement of the receptacle-carrying arm.

The spring 33 is always under tension and takes up any looseness between the parts adjacent the bracket and prevents their rattling due to vibration of the vehicle or the engine thereof when running, but the spring itself would have little effect in preventing the vibration of the cover 30 against the head 23 of the receptacle-carrying arm in inaccessible position of the receptacle due to the length of the arm 21 and plate 20. To avoid such rattling, however, between the plate 30 and the head 23, the present invention provides means for firmly holding these two parts together in the inaccessible position of the receptacle.

This means comprises an arm 36 on the plate 20 having a vertical portion 37 and a horizontal portion 38 forming a pocket 39 into which the receptacle-carrying arm 21 extends, the latter having its peripheral flange 40 provided with a vertical extension 41 and a horizontal extension 42 adapted to form a wedge 43 adapted to enter the pocket 39. The horizontal portion 38 of the arm 36 at its end is provided with a downwardly bent lip 44 adapted to be struck by the corner formed by the extension 41 of the flange 40 and the horizontal portion 42 of the carrying arm 21 so that the arm 21 will be raised as the wedge enters the pocket. The pocket 39 is smaller than the wedge 43 and hence the horizontal portion 38 of the plate 20 is placed under tension when the arm 21 moves from the position shown in Fig. 5 to the position shown in Fig. 6, and this firmly holds the plate 30 and enlarged head 23 of the receptacle-carrying arm 21 in contact so that no rattle will be produced as the result of vibrations in the body of the motor vehicle.

The pocket 39 and wedge 43 and their constituent parts have other functions equally as important as the one described. One of these functions is to draw the plate 30 and enlarged head 23 of the receptacle-carrying arm into such close contact that very little air if any can enter the receptacle 22, and thus any smoldering articles therein will be smothered.

Another function of the pocket 39 and wedge 43 is to constitute cooperating stops for determining the inaccessible position of the receptacle-carrying arm 21, for the normal inaccessible position of the receptacle-carrying arm will depend upon how far the wedge 43 on the latter can enter the pocket 39 on the plate 20.

Another function of the pocket 39 and wedge 43 is to absorb the shock resulting from the return of the receptacle-carrying arm to its inaccessible position under the influence of the spring 33, for by having the pocket normally slightly smaller than the wedge, the horizontal portion 38 of the pocket and the horizontal portion 42 of the wedge will frictionally engage each other during the last portion of the movement of the receptacle-carrying arm 21 and with the yielding action of the horizontal portion 38 gradually brings the receptacle-carrying arm to a stop and prevent its rebounding.

It will thus be noted that by the simple means of the pocket 39 and wedge 43, four results are obtained—namely, (1) the plate 20 with its rear extension 30 is held from rattling against the receptacle-carrying arm 21 with its enlarged head 23; (2) the extension 30 of the plate 20 is drawn down closely against the enlarged portion 23 of the receptacle-carrying arm to exclude air from the receptacle while the latter is in its inaccessible position; (3) the normal inaccessible position of the receptacle is determined; and (4) the shock incidental to the arrival of the receptacle-carrying arm at its normal inaccessible position is absorbed.

The pivotal connection between the plate 20 and receptacle-carrying arm 21 is constituted by a pin 45 arranged in the plate at right angles thereto passing through a hole in the receptacle-carrying arm 21 and having at its end a flange 46 underlying the arm 21. At its upper end a head 47 overlies the plate 20, which, it will be remembered, is riveted to the arm 17 of the bracket. The latter is provided with a cut-out or hole 48 through which the head 47 may extend. In assembling the device, the pin 45 after being passed through aligned holes in the plate 20 and receptacle-carrying arm 21 has its head 47 spun over; then the subassembly constituting the plate 20 and receptacle-carrying arm 21 is riveted to the arm 17. The portion 49 of the receptacle-carrying arm adjacent the pivot pin 45 is embossed to provide a bearing surface adapted to engage the plate 20.

In order that the receptacle 22 may be well concealed behind the instrument board 10 in its inaccessible position and so that danger of it being struck by the knees of a person sitting in the seat adjacent the instrument board is obviated, the receptacle-carrying arm is not swung in a horizontal plane, but in a plane which inclines upwardly and rearwardly with relation to the instrument board, in accordance with the present invention. This is accomplished by bending the arm 17 of the bracket upwardly from its point of connection with the vertical arm 18 of the bracket, preferably until the arm 17 engages the horizontal arm 13 of the bracket as shown in Figs. 2 and 7. In this way, the axis of the pin 45, i. e. the axis of oscillation of the receptacle-carrying arm 21, is inclined forwardly and upwardly and so that in its normal position the receptacle is up and in back of the instrument board. When the handle 32 is operated to initiate the forward movement of the receptacle and its carrying arm, they swing downwardly and forwardly from the position shown in Fig. 7 to that shown in Fig. 2, and this movement of the receptacle and its carrying arm is assisted by gravity in addition to the spring 23. When the receptacle-carrying arm reaches the forward limit of its movement, which is defined by the ear 34 carrying one end of the spring 33, being engaged by a portion 50 of the receptacle-carrying arm to which the handle 32 is attached, the opening 26 in the receptacle-carrying arm will be located forwardly of the instrument board 10 so that ashes, cigarette butts, or other articles, may be deposited in the receptacle 22, and this is further facilitated by the inclined position of the receptacle-carrying arm.

In order that the ash-receiver may be in harmony with the hardware of the particular motor vehicle to which it is to be attached, both as to shape, design and color without necessitating the manufacture of separate devices for each particular kind of car, the handle 32 is made separate from the receptacle-carying arm 21 and is provided with a screw-threaded stem 51 which passes through the hole in the portion 50 of the receptacle-carrying arm and is preferably held thereto by a nut 52. By this provision, the ash-receiver without the handle 32 may be supplied to the car manufacturer who may have the handles 32 designed and made in accordance with the rest of the hardware on the car and apply these handles to the devices while mounting the ash-receiver on the instrument board. Or, the device may be made with standard handles 32 which may be removed and replaced by other handles by the car manufacturer.

Variations and modifications may be made within the scope of this invention and portions of the improvements may be used without others.

Having thus described the invention, what is claimed as new and for which it is desired to obtain Letters Patent, is:—

1. An ash receiver for motor vehicles comprising a supporting frame attachable to an instrument board; an ash receptacle; means movably mounted on the supporting frame and carrying the ash receptacle to move the latter from a position back of the instrument board to an accessible position in front thereof for use; means for operating said ash receptacle carrying means to initiate the movement of the latter which causes the ash receptacle to move from accessible position toward inaccessible position; spring means biased by the initial movement of the ash receptacle carrying means for completing said movement to cause the ash receptacle to be moved to inaccessible position; and a buffer for absorbing the shock incidental to the return of the receptacle carrying means to inaccessible position under the influence of said spring means.

2. An ash receiver for motor vehicles comprising a supporting frame attachable to an instrument board; an ash receptacle; means movably mounted on the supporting frame and carrying the ash receptacle to move the latter from a position back of the instrument board to an accessible position in front thereof for use; means for operating said ash receptacle carrying means to initiate the movement of the latter which causes the ash receptacle to move from accessible position to inaccessible position; spring means biased by the initial movement of the ash receptacle carrying means for completing said movement to cause the ash receptacle to be moved to inaccessible position; cooperating stops on the frame and on the receptacle carrying means for determining the inaccessible position of the latter; and means retarding movement of said receptacle carrying means in advance of the engagement of said stops when the receptacle carrying means is returned to inaccessible position under the influence of said spring means.

3. An ash receiver for motor vehicles comprising a supporting frame attachable to an instrument board; an ash receptacle; means movably mounted on the supporting frame and carrying the ash receptacle to move the latter from a position back of the instrument board to an accessible position in front thereof for use; spring means adapted to be biased to complete the movement of the ash receptacle carrying means when the latter is moved to make the ash receptacle inaccessible; and a combined stop and buffer to determine the inaccessible position of the receptacle carrying means and reduce the shock incidental to the arrival of the receptacle carrying means at its inaccessible position under the influence of said spring means.

4. An ash receiver for motor vehicles comprising a supporting frame attachable to an instrument board; an ash receptacle; means movably mounted on the supporting frame and carrying the ash receptacle to move the latter from a position back of the instrument board to an accessible position in front thereof for use; and cooperating means on the frame and the ash receptacle carrying means adapted to nest when the latter is in inaccessible position behind the instrument board to prevent rattling of the receptacle carrying arm against the frame which might tend to result from vibration of the vehicle or the motor thereof.

5. An ash receiver for motor vehicles comprising a supporting frame attachable to an instrument board; an ash receptacle; means movably mounted on the supporting frame and carrying the ash receptacle to move the latter from a position back of the instrument board to an accessible position in front thereof for use; means for closing the ash receptacle when the latter is moved from accessible to inaccessible position to smother any burning contents in the receptacle; and means for holding the ash receptacle carrying means and the closing means against rattling against each other when the receptacle is closed by said closure means.

6. An ash receiver for motor vehicles comprising a supporting frame attachable to an instrument board; an ash receptacle; an arm movably mounted on the supporting frame and carrying the ash receptacle to move the latter from a position back of the instrument board to an accessible position in front thereof for use; a plate carried by the supporting frame and adapted to overlie and cover the ash receptacle when the latter is in position back of the instrument board to smother any burning contents in the receptacle; and cooperating means on the plate and arm for holding said plate and arm against rattling against each other when the arm lies under the plate.

7. An ash receiver for motor vehicles comprising a supporting frame attachable to an instrument board; an ash receptacle; an arm movably mounted on the supporting frame and carrying the ash receptacle to move the latter from a position back of the instrument board to an accessible position in front thereof for use; a plate fixed to the supporting frame and beneath which the ash receptacle slides when the latter is returned to its inaccessible position behind the instrument board to smother any burning contents in the receptacle; and means on the plate and arm for drawing the same in a vertical plane into engagement with each other as the arm approaches inaccessible position.

8. An ash receiver for motor vehicles comprising a bracket adapted to be clamped to the lower edge or flange of the instrument board and having an arm inclined forwardly and downwardly with relation to the instrument board; an ash receptacle; a carrying arm therefor; and means for mounting the latter on the inclined arm of the bracket for movement about an axis at right angles to said arm and inclined upwardly and forwardly with relation to the instrument board so that the ash receptacle may be moved from a concealed position up in back of the instrument board to an accessible position down and in front of the instrument for use.

9. An ash receiver for motor vehicles comprising a bracket adapted to be clamped to the lower edge or flange of the instrument board and having an arm inclined forwardly and downwardly with relation to the instrument board; an ash receptacle; carrying means therefor; a plate secured to the bracket and lying parallel with said inclined arm of the bracket; and a pivot pin carried by said plate and having a head lying in an opening of the inclined arm of the bracket for mounting the ash receptacle carrying means for movement, the axis of the pin being at right angles to the said inclined arm and being inclined so that the ash receptacle may be moved from a concealed position up in back of the instrument board to an accessible position down and in front of the instrument board for use.

10. An ash receiver for motor vehicles comprising a supporting frame attachable to an instrument board; an ash receptacle; means movably mounted on the supporting frame and carrying the ash receptacle to move the latter from a position back of the instrument board to an accessible position in front thereof for use; spring means for completing the movement of the receptacle-carrying means to inaccessible position; and a buffer for absorbing the shock incidental to the return of the receptacle carrying means to inaccessible position under the influence of said spring means.

11. An ash receiver for motor vehicles comprising a supporting frame attachable to an instrument board; an ash receptacle; means movably mounted on the supporting frame and carrying the ash receptacle to move the latter from a position back of the instrument board to an accessible position in front thereof for use; cooperating stops on the frame and on the receptacle carrying means for determining the inaccessible position of the latter; and means retarding movement of said receptacle carrying means in advance of the engagement of said stops when the receptacle carrying means is returned to inaccessible position.

12. An ash receiver for motor vehicles comprising a supporting frame attachable to an instrument board; an ash receptacle; means movably mounted on the supporting frame and carrying the ash receptacle to move the latter from a position back of the instrument board to an accessible position in front thereof for use; and a combined stop and buffer to determine the inaccessible position of the receptacle carrying means and reduce the shock incidental to the arrival of the receptacle carrying means at its inaccessible position.

13. An ash receiver for motor vehicles comprising a supporting frame attachable to an instrument board; an ash receptacle; means movably mounted on the supporting frame and carrying the ash receptacle to move the latter from a position back of the instrument board to an accessible position in front thereof for use; and a combined stop and buffer to determine the inaccessible position of the receptacle carrying means and reduce the shock incidental to the arrival of the receptacle carrying means at its inaccessible position, said combined stop and buffer comprising overlapping parts frictionally engaged when the receptacle is in inaccessible position to frictionally retain the receptacle in that position.

14. An ash receiver for motor vehicles comprising a supporting frame attachable to an instrument board; an ash receptacle; means movably mounted on the supporting frame and carrying the ash receptacle to move the latter from a position back of the instrument board to an accessible position in front thereof for use; spring means adapted to be biased to complete the movement of the ash receptacle carrying means when the latter is moved to make the ash receptacle inaccessible; and a combined stop and buffer to determine the inaccessible position of the receptacle carrying means and reduce the shock incidental to the arrival of the receptacle carrying means at its inaccessible position under the influence of said spring means, said combined stop and buffer comprising overlapping parts frictionally engaged when the receptacle is in inaccessible position to frictionally retain the receptacle in that position.

15. An ash receiver for motor vehicles comprising a supporting frame attachable to an instrument board; an ash receptacle; means movably mounted on the supporting frame and carrying the ash receptacle to move the latter from a position back of the instrument board to an accessible position in front thereof for use; and a combined stop and buffer to determine the inaccessible position of the receptacle carrying means and reduce the shock incidental to the arrival of the receptacle carrying means at its inaccessible position, said combined stop and buffer having overlapping parts adapted to hold the ash receptacle carrying means and the supporting frame from rattling against each other when the receptacle is in inaccessible position.

16. An ash receiver for motor vehicles comprising a supporting frame attachable to an instrument board; an ash receptacle; means movably mounted on the supporting frame and carrying the ash receptacle to move the latter from a position back of the instrument board to an accessible position in front thereof for use; spring means adapted to be biased to complete the movement of the ash receptacle carrying means when the latter is moved to make the ash receptacle inaccessible; and a combined stop and buffer to determine the inaccessible position of the receptacle carrying means and reduce the shock incidental to the arrival of the rceptacle carrying means at its inaccessible position under the influence of said spring means, said combined stop and buffer having overlapping parts adapted to hold the ash receptacle carrying means and the supporting frame from rattling against each other when the receptacle is in inaccessible position.

17. An ash receiver for motor vehicles comprising a supporting frame attachable to an instrument board; an ash receptacle; means movably mounted on the supporting frame and carrying the ash receptacle to move the latter from a position back of the instrument board to an accessible position in front thereof for use; means for operating said ash receptacle carrying means to initiate the movement of the latter which causes the ash receptacle to move from accessible position toward inaccessible position; spring means biased by the initial movement of the ash receptacle carrying means for completing said movement to cause the ash receptacle to be moved to inaccessible position; and means for absorbing the shock incidental to the return of the receptacle carrying means to inaccessible position, under the influence of said spring means.

18. An ash receiver for motor vehicles comprising a supporting frame attachable to an instrument board; an ash receptacle; means movably mounted on the supporting frame and carrying the ash receptacle to move the latter from a position back of the instrument board to an accessible position in front thereof for use; means for operating said ash receptacle carrying means to initiate the movement of the latter which causes the ash receptacle to move from accessible position to inaccessible position; spring means biased by the initial movement of the ash receptacle carrying means for completing said movement to cause the ash receptacle to be moved to inaccessible position; cooperating stops on the frame and on the receptacle carrying means for determining the inaccessible position of the latter; and means for absorbing the shock incidental to engagement of said stops when the receptacle carrying means is returned to inaccessible position under the influence of said spring means.

19. An ash receiver for motor vehicles comprising a supporting frame attachable to an instrument board; an ash receptacle; means movably mounted on the supporting frame and carrying the ash receptacle to move the latter from a position back of the instrument board to an accessible position in front thereof for use; spring means adapted to be biased to complete the movement of the ash receptacle carrying means when the latter is moved to make the ash receptacle inaccessible; and a combined stop and shock absorbing means to determine the inaccessible position of the receptacle carrying means and to absorb the shock incidental to the arrival of the receptacle carrying means at its inaccessible position under the influence of said spring means.

20. An ash receiver for motor vehicles comprising a supporting frame attachable to an instrument board; an ash receptacle; an arm movably mounted on the supporting frame and carrying the ash receptacle to move the latter from a position back of the instrument board to an accessible position in front thereof for use; a plate fixed to the supporting frame and beneath which the ash receptacle slides when the latter is returned to its inaccessible position behind the instrument board to smother any burning contents in the receptacle; and means on the plate and arm for drawing the same into engagement with each other as the arm approaches inaccessible position.

21. An ash receiver for motor vehicles comprising a supporting frame attachable to an instrument board; an ash receptacle; an arm pivotally mounted on the supporting frame having an end carrying the ash receptacle, said arm being movable to carry the ash receptacle to and from positions back of the instrument board where it is inaccessible to an accessible position in front thereof for use; spring means tending to complete the movement of the arm when moving to carry the ash receptacle to either accessible or inaccessible position; and manually engageable means secured to said arm and located adjacent the pivotal mounting thereof and remote from the receptacle carrying end for operating the arm when it is desired to move the receptacle from inaccessible to accessible position.

22. An ash receiver for motor vehicles comprising a supporting frame attachable to an instrument board; an ash receptacle; an arm pivotally mounted on the supporting frame having an end carrying the ash receptacle, said arm being movable to carry the ash receptacle to and from positions back of the instrument board where it is inaccessible to an accessible position in front thereof for use; spring means tending to complete the movement of the arm when moving to carry the ash receptacle to either accessible or inaccessible position; and a finger piece secured to said arm and located adjacent the pivotal mounting thereof and remote from the receptacle carrying end for operating the arm when it is desired to move the receptacle from inaccessible to accessible position.

23. An ash receiver for motor vehicles comprising a supporting frame attachable to an instrument board; an ash receptacle; an arm pivotally mounted on the supporting frame having an end carrying the ash receptacle, said arm being movable to carry the ash receptacle to and from positions back of the instrument board where it is inaccessible to an accessible position in front thereof for use; spring means tending to complete the movement of the arm when moving to carry the ash receptacle to either accessible or inaccessible position; and a finger piece secured to said arm and located adjacent the pivotal mounting thereof and remote from the receptacle carrying end for operating the arm when it is desired to move the receptacle from inaccessible to accessible position, said finger piece being located in front of the instrument board when the ash receptacle is in inaccessible position and said arm being swung to carry the ash receptacle to an accessible position by direct manual engagement therewith or with the receptacle carried thereby.

Signed at Bridgeport, in the county of Fairfield and State of Connecticut, this 6th day of December, 1929.

JOSEPH H. COHEN.